US011320072B2

(12) United States Patent
Bertoni et al.

(10) Patent No.: US 11,320,072 B2
(45) Date of Patent: May 3, 2022

(54) METHOD OF MODERNIZING A FLUID TRANSPORT FLEXIBLE CONDUIT LINE, END FITTINGS JOINT AND INTERCONNECTION MODULE

(71) Applicant: SIMEROS PROJETOS ELETROMECANICOS LTDA, Porto Alegre (BR)

(72) Inventors: Fabiano Bertoni, RS (BR); Facundo Sebastian Lopez, RS (BR)

( * ) Notice: Subject to any disclaimer, the term of this patent is extended or adjusted under 35 U.S.C. 154(b) by 684 days.

(21) Appl. No.: 16/212,913

(22) Filed: Dec. 7, 2018

(65) Prior Publication Data
US 2019/0249806 A1 Aug. 15, 2019

(51) Int. Cl.
*E21B 17/01* (2006.01)
*E21B 17/02* (2006.01)
(Continued)

(52) U.S. Cl.
CPC .......... *F16L 23/003* (2013.01); *E21B 17/015* (2013.01); *E21B 17/02* (2013.01);
(Continued)

(58) Field of Classification Search
CPC ................................ E21B 17/015; E21B 17/02
See application file for complete search history.

(56) References Cited

U.S. PATENT DOCUMENTS 3,506,039 A * 4/1970 Marriott .................. F16L 39/00
138/114
6,039,083 A 3/2000 Loper
(Continued)

*Primary Examiner* — Matthew R Buck
(74) *Attorney, Agent, or Firm* — Pilloff Passino & Cosenza LLP; Sean A. Passino; Rachel K. Pilloff

(57) ABSTRACT

The invention proposes a method of modernizing a flexible conduit line (50), wherein the modernization method comprises the following steps performed in at least one end fittings joint (11, 12, 13), namely, removing a check valve (16) or a plug (17) from at least one outlet port (15) of an end fitting (111, 121, 131), removing a check valve (16') or a plug (17') of at least one outlet port (15') of an adjacent end fitting (111', 121', 131'), installing a tubular line (90) in an external position to provide fluid communication between said at least one outlet port (15) of the end fitting (111, 121, 131) and said at least one outlet port (15') of the adjacent end fitting (111', 121', 131'). The invention further proposes an end fittings joint (12) comprising an end fitting (121) and an adjacent end fitting (121'), the end fittings joint (12) comprising a tubular line (90) positioned externally to the end fittings (121, 121') in order to establish fluid communication between at least one outlet port (15) of the end fitting and at least one outlet port (15') of the adjacent end fitting (121'). The invention further proposes an interconnection module (80) connectable to a first end fitting (121) suitable to be installed in a first flexible conduit segment (52) and connectable to a second end fitting (121') suitable to be installed in a second flexible conduit segment (53). The interconnection module (80) further comprises a tubular line (90) in an external position configured to provide fluid communication between at least one outlet port (15) of the first end fitting (121) and at least one port (15') of the second end fitting (121').

20 Claims, 8 Drawing Sheets

(51) Int. Cl.
*F16L 23/00* (2006.01)
*F16L 29/00* (2006.01)
*F16L 55/07* (2006.01)
*E21B 41/00* (2006.01)
*E21B 43/01* (2006.01)

(52) U.S. Cl.
CPC .......... *E21B 41/0007* (2013.01); *E21B 43/01* (2013.01); *F16L 29/007* (2013.01); *F16L 55/07* (2013.01)

(56) References Cited

U.S. PATENT DOCUMENTS

| | | | |
|---|---|---|---|
| 8,857,521 B2 * | 10/2014 | Clements | E21B 43/01 166/352 |
| 9,546,751 B2 | 1/2017 | Roberts et al. | |
| 2010/0068986 A1 * | 3/2010 | Eccleston | G01M 3/283 454/339 |

* cited by examiner

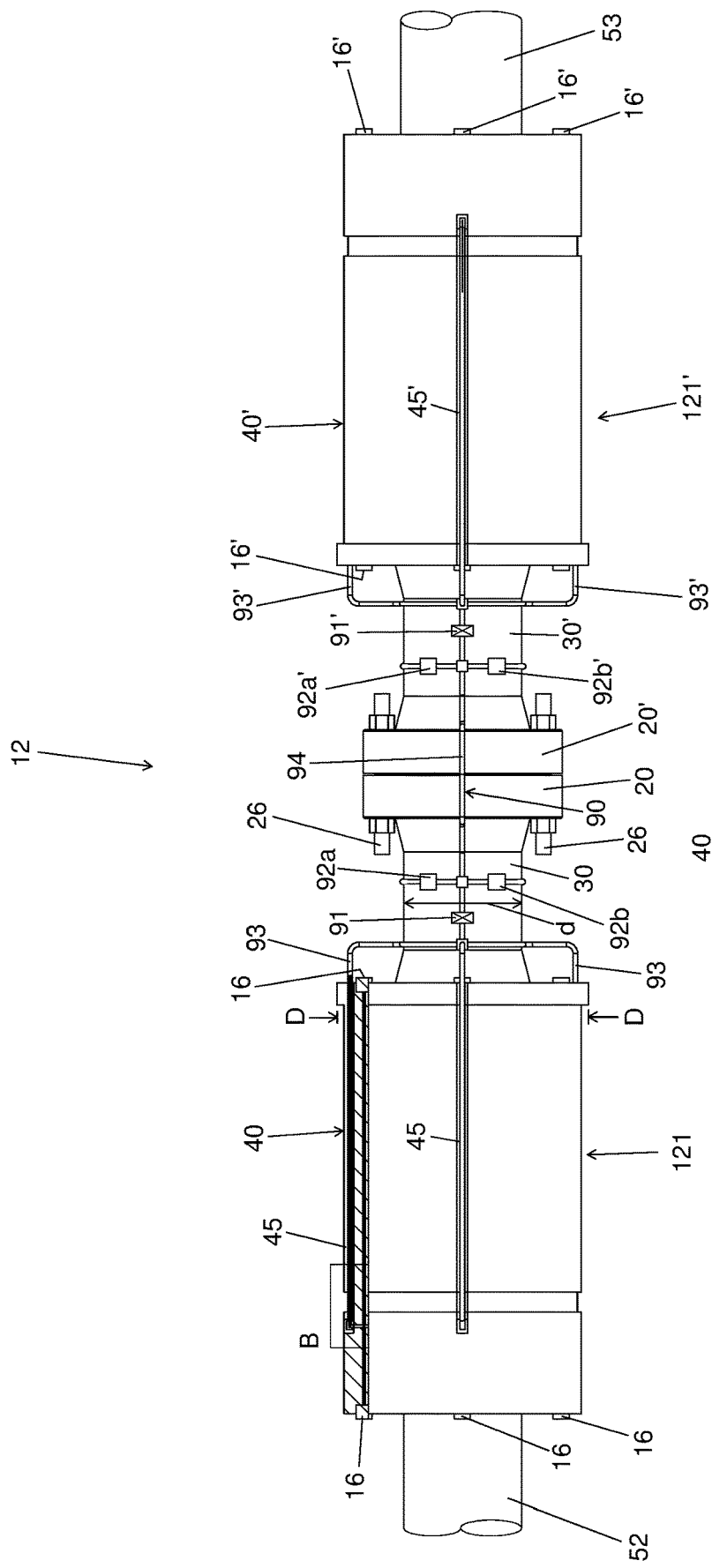
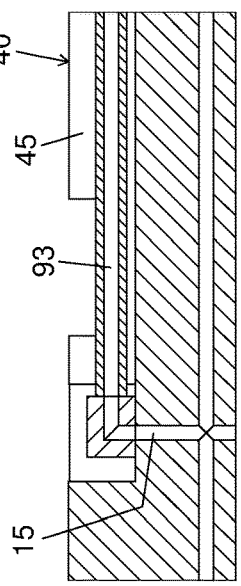
Fig. 7
Fig. 8

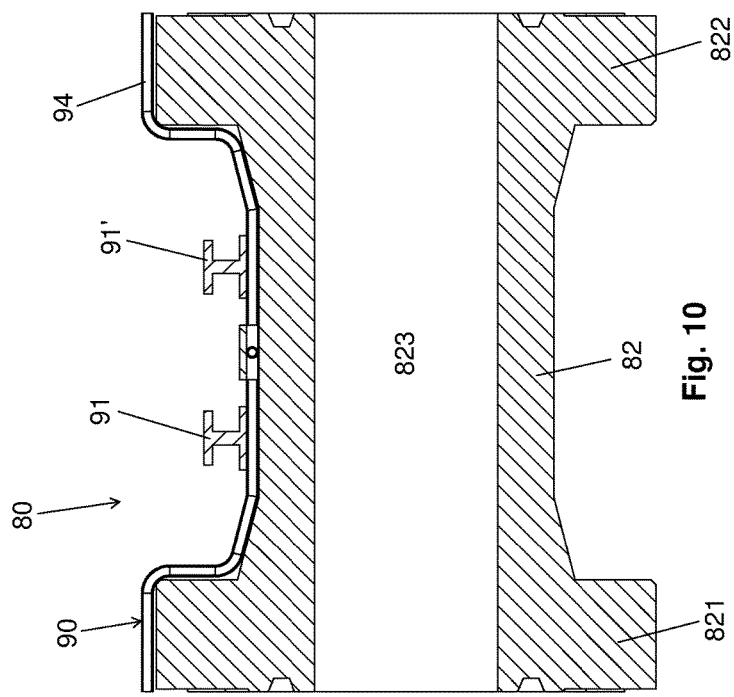
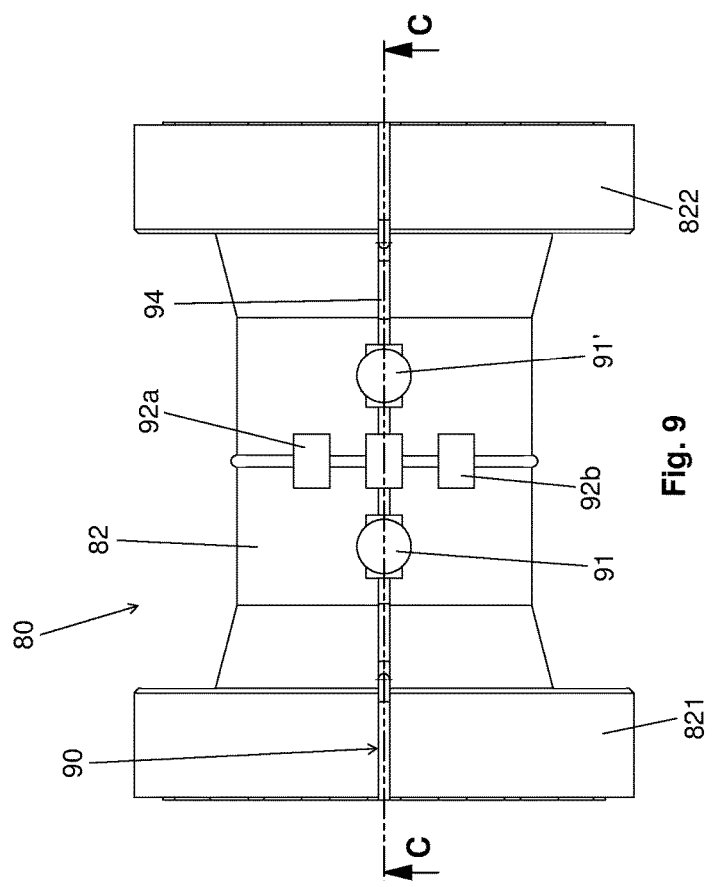
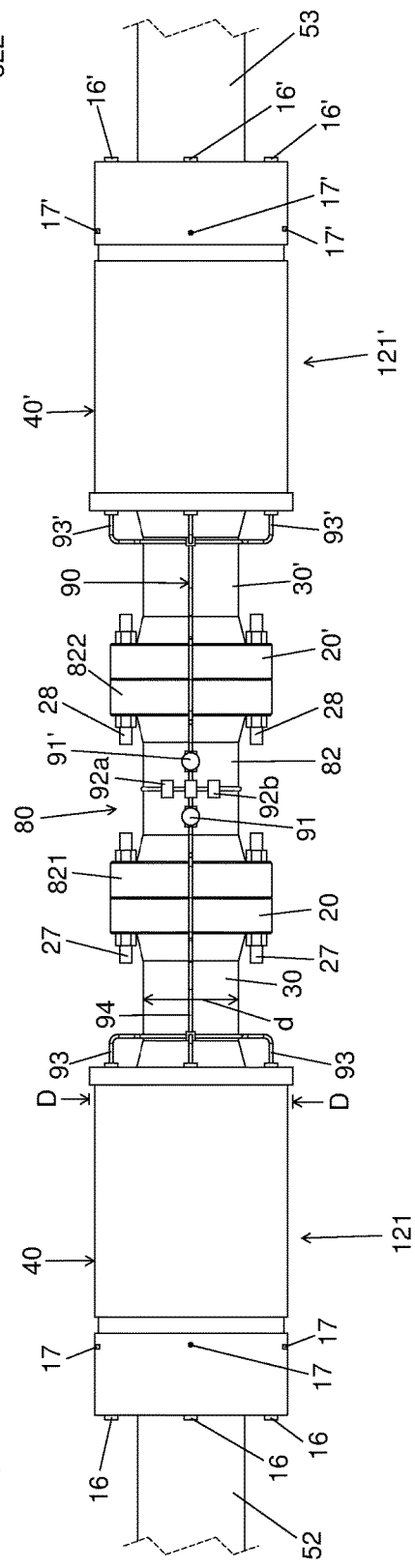
Fig. 10
Fig. 9
Fig. 11

METHOD OF MODERNIZING A FLUID TRANSPORT FLEXIBLE CONDUIT LINE, END FITTINGS JOINT AND INTERCONNECTION MODULE

TECHNICAL FIELD

The invention relates to a flexible conduit line used for fluid transport in offshore oil and gas extraction systems. Particularly, the invention relates to gas exhaustion, which permeates into the flexible conduit body from the fluid, such as oil, water or gas, being transported by the flexible conduit.

BACKGROUND OF THE INVENTION

A flexible conduit line comprises a plurality of flexible conduit segments, each segment typically manufactured in a length from 500 to 1,000 meters. Due to a need for the flexible conduit line to reach a certain length, the different flexible conduit segments are connected together through end fittings joints. An end fittings joint comprises an end fitting installed at one end of a flexible conduit segment, said end fitting being connected to an adjacent end fitting installed at one end of an adjacent flexible conduit segment. Each end fitting comprises a cylindrical body followed by a neck terminated in a connecting flange having a connection face. The connection between an end fitting and an adjacent end fitting constitutes a face-to-face connection of the connecting faces of the connecting flanges of both end fittings and fastening by bolts through both connecting flanges.

When the flexible conduit line is installed in an offshore environment, the plurality of flexible conduit segments and the end fittings joints are arranged so that the flexible conduit line extends from a submerged region in water to a region above the surface of the water. For example, the flexible conduit line may include a portion called flow line, which comprises at least one flexible conduit segment, integrally or in part, resting on the seabed, connected to a riser portion, which comprises at least one flexible conduit segment extending to a region above the surface of the water present in a floating facility, such as a ship or an oil extraction platform.

Each flexible conduit segment comprises a flexible conduit body formed of multiple layers of different shapes and materials in order to establish an inner channel suitable for fluid transport. The flexible conduit body includes a first fluid retention layer and at least one additional fluid retention layer, which act as sealing layers to prevent radial flow of fluid through the flexible conduit body. For example, the first retention layer may be an inner retention layer that serves to retain the transporting fluid within the inner channel of the flexible conduit and the additional retention layer may be an outer retention layer which has the function of preventing the seawater from entering into the flexible conduit. The retention layers are polymeric or composite material and exhibit a high degree of impermeability.

The inner retention layer and the outer retention layer define between them an annular region, within which are contained structural layers of the flexible conduit segment, including at least one pressure armor responsible for providing resistance to the flexible conduit, in particular with respect to the pressure of the fluid being transported, and at least one pair of tensile armors, including one inner tensile armor and one outer tensile armor, which are responsible for withstanding the tensile forces incident on the flexible conduit. Pressure and tensile armors are usually fabricated from metallic or composite material.

In operation, a production or injection fluid is transported through the inner channel of the flexible conduit segment. The fluid may be gas or liquid containing gas. Although the inner retention layer has a certain degree of impermeability, over time the gas contained in the production or injection fluid slowly permeates through the inner retention layer and enters the annular region. Thus, gas permeating through the inner retention layer tends to accumulate in the annular region. If this gas is not discharged there will be a gas pressurizing in the annular region, which may cause a failure in the flexible conduit. In addition, the gas permeated into the annular region may comprise water vapor ($H_2O$), methane ($CH_4$), carbon dioxide ($CO_2$), hydrogen sulfide ($H_2S$), among others. In the presence of certain gases and electrolytes, the metallic components contained in the annular region, such as the pressure armor and the tensile armor, are subject to the corrosion process, which can lead to the failure of these structural layers and, consequently, of the flexible conduit.

In this context, there are known end fittings joints in which each end fitting comprises outlet ports in fluid communication with the annular region of the flexible conduit segment in which the end fitting is installed, each outlet port being provided with a check valve configured to open when a pressure differential is reached in order to allow gas exhaust from the annular region to an outside environment relative to the flexible conduit segment. Each check valve opens only when the internal pressure from the annular region is greater than the external pressure, for example with the pressure differential set at about 2 bar. Typically, the gas is discharged directly into the marine environment surrounding the end fitting.

U.S. Pat. No. 9,546,751 discloses a flexible conduit segment comprising an intermediate fluid retention layer, in addition to the inner fluid retention layer and the outer fluid retention layer. The inner fluid retention layer and the intermediate fluid retention layer form between them an inner annular region within which the pressure armor is contained. The intermediate fluid retention layer and the outer fluid retention layer form between them an outer annular region, within which the tensile armors are contained. U.S. Pat. No. 9,546,751 also discloses an end fitting suitable to be installed at one end of the flexible conduit segment. The end fitting comprises a first exhaust path which establishes fluid communication between the inner annular region of the flexible conduit segment and an outlet port of the end fitting in order to discharge the gas contained in the inner annular region of the flexible conduit segment, and a second exhaust path which establishes fluid communication between the outer annular region of the flexible conduit segment and an outlet port of the end fitting in order to discharge gas contained in the outer annular region of the flexible conduit segment. Each outlet port is equipped with a check valve configured to open when a pressure differential is reached, i.e., only when the internal pressure from the annular region is greater than the external ambient pressure, according to the value of pressure differential defined by the check valve. With two annular regions, the gas contained in the production fluid permeates first into the inner annular region. A portion of this gas is discharged through the first exhaust path and another portion may permeate into the outer annular region, then to be discharged through the second exhaust path. Although U.S. Pat. No. 9,546,751 describes the possibility of transporting the gas released at each end fitting through an external tubular conduit to a flaring system present on the surface of the water, in practice, normally the submerged end fittings discharge the gas directly into the marine environment surrounding the end fittings.

Alternatively, U.S. Pat. No. 6,039,083 discloses an end fittings joint wherein each end fitting comprises an internal tubular conduit having an inlet aperture in fluid communication with the annular region of the respective flexible conduit segment in which the end fitting is installed, each internal tubular conduit extending through inside the neck of each end fitting and terminating in a circumferential groove present in the connecting face of the connecting flange of each end fitting. Since at the end fittings joint, the connector face of the end fitting and the connector face of the adjacent end fitting are in close contact, the internal tubular conduit of the end fitting is in fluid communication with the internal tubular conduit of the adjacent end fitting, so that the annular region of the flexible conduit segment is in fluid communication with the annular region of the adjacent flexible conduit segment. In a flexible conduit line where all end fittings joints are configured in accordance with the end fittings joint of U.S. Pat. No. 6,039,083, there is fluid interconnection between the annular regions of all flexible conduit segments. Thus, the gas permeating into the annular region of each flexible conduit segment may run through the flexible conduit line to be discharged through an outlet port present in a top end fitting installed in a region above the water surface.

SUMMARY OF THE INVENTION

The invention aims to provide a solution related to gas exhaustion that permeates into the annular region of the flexible conduit segments of a flexible conduit line as an alternative to the solutions present in the prior art.

The invention provides a method of modernizing a flexible conduit line for updating the flexible conduit line from a configuration wherein the gases permeating to an annular region of a flexible conduit segment are discharged to the marine environment through check valves present in the end fittings to a configuration in which gases permeating into an annular region of a flexible conduit segment are discharged via fluid interconnection between the annular regions of at least two flexible conduit segments.

The invention proposes a method of modernizing a flexible conduit line, wherein the modernization method comprises the following steps performed in at least one end fittings joint, namely removing a check valve or a plug from at least one outlet port of an end fitting, removing a check valve or a plug from at least one outlet port of an adjacent end fitting, installing a tubular line in an external position to provide fluid communication between said at least one outlet port of the end fitting and said at least one outlet port of the adjacent end fitting.

Advantageously, the modernization method proposed by the invention makes it possible to update a used flexible conduit line already installed in an operating position or a new flexible conduit line to be installed in an operating position, from a configuration in which the gases permeated to an annular region of each flexible conduit segment are discharged to the marine environment through check valves present in the end fittings, to a configuration in which the gases permeated to an annular region of a flexible conduit segment are discharged through a fluid interconnection established by the tubular line between the annular regions of two adjacent flexible conduits segments without the need for installation a new suitable end fitting at each end of each segment of flexible conduit such as the end fitting disclosed in U.S. Pat. No. 6,039,083. In the context of the modernization of a used flexible conduit line, advantageously, the modernization method proposed by the invention enables a time saving in which the flexible conduit line will be out of operation since the process of installing a new end fitting in a flexible conduit segment is notoriously cumbersome and time-consuming, and there is a financial savings related to the cost of this new end fitting.

The invention further proposes an end fittings joint comprising an end fitting and an adjacent end fitting, the end fittings joint comprising a tubular line positioned externally to the end fittings in order to provide fluid communication between at least one outlet port of the end fitting and at least one outlet port of the adjacent end fitting.

The invention also proposes an interconnecting module comprising a cylindrical body having a longitudinal inner channel, a first end terminated in a first connecting flange connectable to a connecting flange of a first end fitting suitable to be installed at one end of a first flexible conduit segment, and a second end terminated in a second connecting flange connectable to a connecting flange of a second end fitting suitable to be installed at one end of a second flexible conduit segment. The interconnection module further comprises an externally positioned tubular line configured to provide fluid communication between at least one outlet port of the first end fitting and at least one outlet port of the second end fitting.

BRIEF DESCRIPTION OF THE DRAWINGS

The invention will be better understood with the following detailed description, which will best be interpreted when using the figures, namely:

FIG. 7 shows a front view of an end fittings joint according to a third embodiment of the invention.

FIG. 8 shows a detail view of the "B" region shown in FIG. 7.

FIG. 9 shows a front view of an embodiment of an interconnecting module proposed by the invention.

FIG. 10 shows a cross-sectional view taken along the cross-sectional plane C-C shown in FIG. 9.

FIG. 11 shows a front view of the interconnecting module installed in association with an end fittings joint.

DETAILED DESCRIPTION OF THE INVENTION

Figure 1:
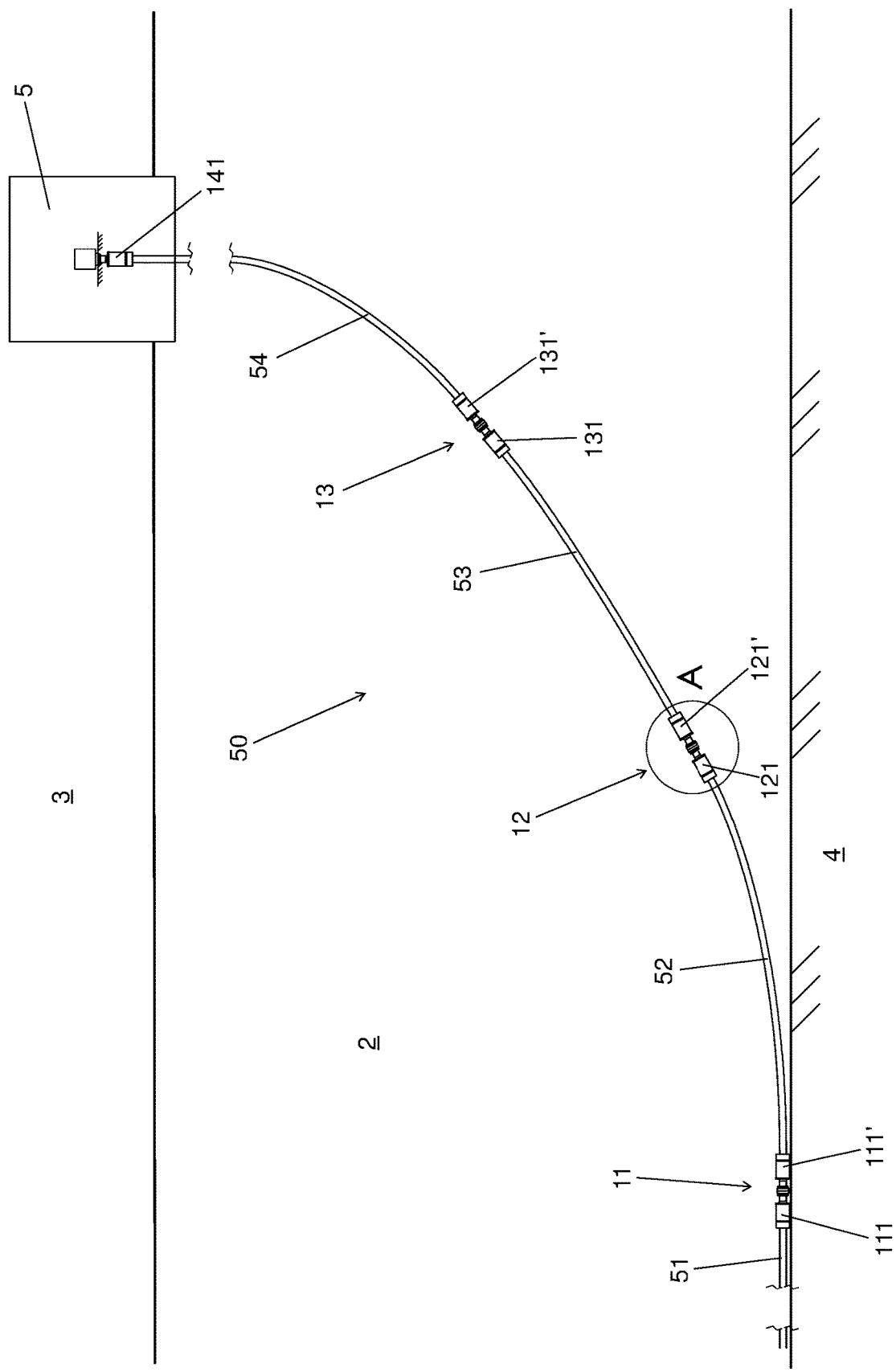
FIG. 1 shows a schematic view of a flexible conduit line installed in an offshore environment.

FIG. 1 shows an example of a flexible conduit line (50) installed in an offshore environment. The flexible conduit line (50) comprises a plurality of flexible conduit segments (51, 52, 53, 54) connected together through end fittings joints (11, 12, 13), due to a need for the conduit line (50)

reaches a certain length. An end fittings joint (11, 12, 13) comprises an end fitting (111, 121, 131) installed at one end of a flexible conduit segment (51, 52, 53), said end fitting (111, 121, 131) being connected to an adjacent end fitting (111', 121', 131') installed at one end of an adjacent flexible conduit segment (52, 53, 54).

In the example shown in FIG. 1, a first flexible conduit segment (51) is connected to a second flexible conduit segment (52) through a first end fittings joint (11) comprising an end fitting (111) installed at one end of the first flexible conduit segment (51) connected to an adjacent end fitting (111') installed at one end of the second flexible conduit segment (52), which is connected to a third flexible conduit segment (53) through a second end fittings joint (12) comprising an end fitting (121) installed at another end of the second flexible conduit segment (52) connected to an adjacent end fitting (121') installed at one end of the third flexible conduit segment (53). Furthermore, the third flexible conduit segment (53) is connected to a fourth flexible conduit segment (54) through a third end fittings joint (13) comprising an end fitting (131) installed at another end of the third conduit segment (53) connected to an adjacent end fitting (131') installed at one end of the fourth flexible conduit segment (54). A top end fitting (141) is installed at the other end of the fourth flexible conduit segment (54).

When the flexible conduit line (50) is installed in the offshore environment, the plurality of flexible conduit segments (51, 52, 53, 54) and the end fittings joints (11, 12, 13) are arranged such that the flexible conduit line (50) extends from a water-submerged region (2) to a region above the water surface (3). In the example shown in FIG. 1, the flexible conduit line includes a portion called flow line, which comprises at least one flexible conduit segment (51), integrally or in part, resting on the sea bed (4), connected to a portion called riser, which comprises at least one flexible conduit segment (52, 53, 54) extending to a region above the water surface (3) present in a floating facility (5), such as, for example, a ship or an oil extraction platform. Particularly, the top end fitting (141) is connected to the floating facility (5). Although FIG. 1 illustrates the flexible conduit line with four flexible conduit segments (51, 52, 53, 54), it is to be understood that this invention applies to a flexible conduit line comprising at least two segments of flexible conduits connected together through an end fittings joint.

Figure 2:
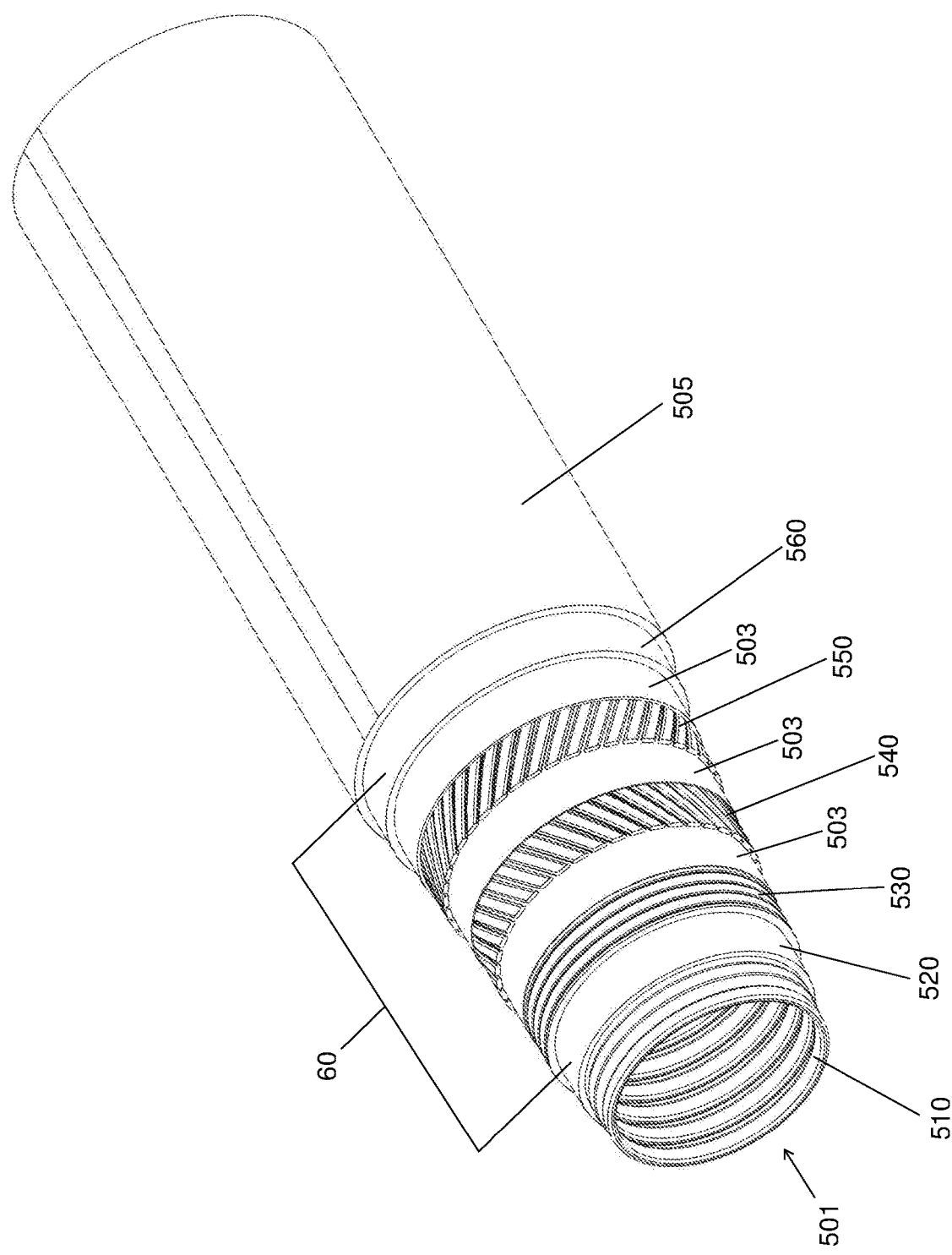
FIG. 2 shows a perspective view of one end of a flexible conduit segment.

Each flexible conduit segment (51, 52, 53, 54), as can be seen in FIG. 2, comprises a flexible conduit body formed of multiple layers of different shapes and materials, so as to establish an inner channel (501), suitable for transporting fluids. The flexible conduit body includes a first fluid retention layer (520) and at least one additional fluid retention layer (560), which act as sealing layers to prevent radial flow of fluid through the flexible conduit body. In the case of the example shown in FIG. 2, the first retention layer (520) is an inner retention layer that serves to retain the transport fluid within the inner channel (501) of the flexible conduit body and the additional retention layer (560) is an outer retention layer intended to prevent sea water from entering into the flexible conduit body. The retention layers (520, 560) are generally made of polymeric or composite material and have a high degree of impermeability.

The adjacent fluid retention layers (520, 560) define between them an annular region (60), as shown in FIG. 2, within which are contained structural layers of the flexible conduit segment, including a pressure armor (530), which is responsible for providing resistance to the flexible conduit, in particular, in relation to the pressure of the transport fluid, and an inner tensile armor (540) and an outer tensile armor (550), which are responsible for supporting the tensile forces applied in the flexible conduit. The pressure armor (530) and tensile armor (540, 550) are usually made of metal material, and the pressure armor (530) is formed by the short pitch helical winding of a metal wire, whereas the inner tensile armor (540) is formed by the long pitch helical winding of a plurality of wires and the outer tensile armor (550) is formed by the long pitch helical winding of another plurality of wires. Alternatively, the pressure armor (530) may be a polymer layer or a composite layer.

Alternatively, according to further embodiments of flexible conduit, the flexible conduit body may further comprise an intermediate fluid retention layer positioned between the inner fluid retention layer and the outer fluid retention layer, wherein the inner layer and the intermediate fluid retention layer form between them an inner annular region, and the intermediate fluid retention layer and the outer fluid retention layer form between them an outer annular region. In this case, normally, the tensile armors are contained within the outer annular region and the pressure armor may be contained within the outer annular region or within the inner annular region. Examples of such types of flexible conduit segments are disclosed in U.S. Pat. No. 9,546,751 and BR 10 2017 014626, which are hereby incorporated by reference.

In the embodiment shown, as can be seen in FIG. 2, the flexible conduit body comprises layers of anti-wear tapes (503), which act to prevent friction between adjacent layers. In the embodiment shown, there is an anti-wear tape (503) between the pressure armor (530) and the inner tensile armor (540), another anti-wear tape (503) between the inner tensile armor (540) and the outer tensile armor (550), and another anti-wear tape (503) on the outer tensile armor (550). The flexible conduit body further comprises a carcass (510) contained internally in the first fluid retention layer (520). The carcass (510) has structural function and is responsible, for example, for supporting the remaining layers in case of de-pressurizing the inner channel (501). The flexible conduit body further comprises an abrasion layer (505) positioned over the outer fluid retention layer (560). The abrasion layer (505) is responsible for performing a mechanical protection, preserving the outer fluid retention layer (560) from shocks and general wear and tear. The flexible conduit body may further comprise further layers, such as, for example, a thermal insulation layer contained within the annular region.

When the flexible conduit line (50) is in operation, a production or injection fluid is transported through the inner channel (501) of the flexible conduit segments (51, 52, 53, 54). The fluid may be gas or liquid containing gas. Although the inner retention layer (520) has a certain degree of impermeability, over time the gas contained in the production or injection fluid slowly permeates through the inner retention layer (520) and enters the annular region (60). Thus, gas permeating through the inner retention layer (520) tends to accumulate in the annular region (60) of each flexible conduit segment (51, 52, 53, 54). If this gas is not discharged, there will be a gas pressurizing in the annular region (60), which may cause a failure in the respective flexible conduit segment (51, 52, 53, 54). In addition, the gas permeated into the annular region may comprise water vapor ($H_2O$), methane ($CH_4$), carbon dioxide ($CO_2$), hydrogen-sulfide ($H_2S$). In the presence of these gases, together with electrolytes, the metal components contained in the annular region (60), such as the pressure armor (530) and the tensile armors (540, 550), are subject to the corrosion process, which can lead to the failure of these structural layers and, consequently, of the respective flexible conduit segment (51, 52, 53, 54).

Figure 3:
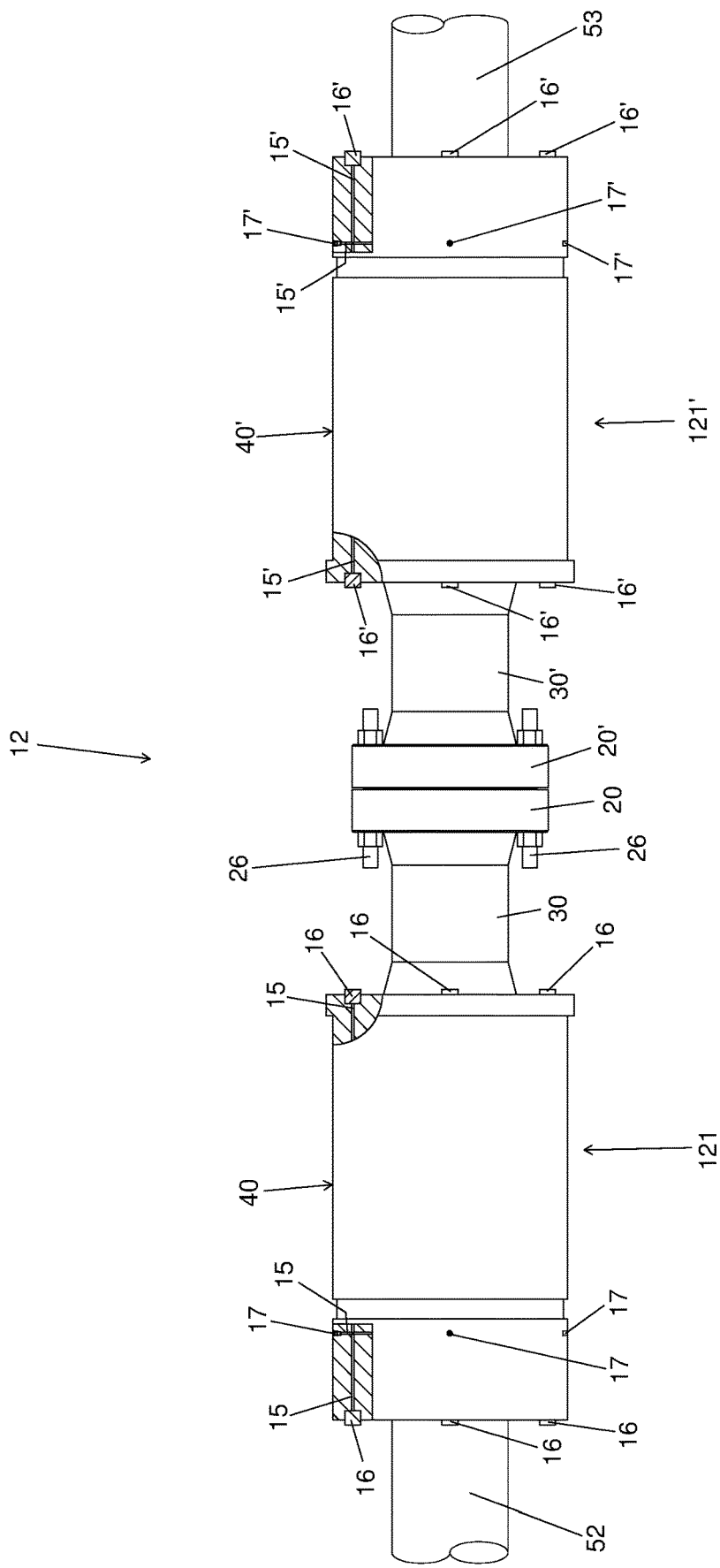
FIG. 3 shows a front view of a conventional end fittings joint, for example coming from region "A" indicated in FIG. 1.

FIG. 3 shows a detail view of the second end fittings joint (12) according to region "A" indicated in FIG. 1. The following description is made on the basis of said end fittings joint (12), however, it is applicable to the other end fittings joints (11, 13) present along the flexible conduit line (50). Each end fitting (121, 121') of the end fittings joint (12) comprises a cylindrical body (40, 40') followed by a neck (30, 30') terminated in a connecting flange (20, 20') with a connecting face. The connection between an end fitting (121) and an adjacent end fitting (121') constitutes a face-to-face connection of the connecting faces of the connecting flanges (20, 20') of both end fittings (121, 121') and securing by bolts (26) through both connecting flanges (20, 20').

Considering the gas permeability problem for the annular region (60), each end fitting (121, 121') of the end fittings joint (12) comprises at least one outlet port (15, 15') in fluid communication with the annular region (60) of the flexible conduit segment (52, 53) in which the end fitting (121, 121') is installed. More particularly, the outlet ports (15) of the end fitting (121) are in fluid communication with the annular region (60) of the flexible conduit segment (52) through a respective exhaust path present internally to the end fitting (121), and the outlet ports (15') of the adjacent end fitting (121') are in fluid communication with the annular region (60) of the adjacent flexible conduit segment (53) through a respective exhaust path present internally to the adjacent end fitting (121'). The exhaust paths present internally to the end fittings (121, 121') may be configured, for example, as described in U.S. Pat. No. 9,546,751 or BR 10 2017 014626. If the flexible conduit segment comprises an inner annular region and an outer annular region, each end fitting may comprise a first exhaust path in fluid communication with the inner annular region and a second exhaust path in fluid communication with the outer annular region.

The outlet ports (15, 15') are provided with a respective check valve (16, 16') configured to open when a pressure differential is reached, so as to allow gas exhaust from the annular region (60) to an outside environment relative to the flexible conduit segment (52, 53). In operation, each check valve (16, 16') opens only when the internal pressure from the annular region (60) is greater than the external pressure, for example with the pressure differential set at about 2 bar. Typically, the gas is discharged directly into the marine environment (2) surrounding the end fitting (121, 121'). Not all outlet ports (15, 15') of the end fittings (121, 121') are provided with check valves (16, 16'), and some outlet ports (15, 15') may be equipped with a respective plug (17, 17').

In the embodiment shown in FIG. 3, each end fitting (121, 121') comprises four longitudinally outlet ports (15, 15') distributed circumferentially and equidistantly in an anterior face of the cylindrical body (40, 40'), which faces towards the respective connecting flange (20, 20'), four longitudinal outlet ports (15, 15') distributed circumferentially and equidistantly at a rear face of the cylindrical body (40, 40'), which faces the respective flexible conduit segment (52, 53), each of said outlet ports (15, 15') being equipped with a respective check valve (16, 16'). Each end fitting (121, 121') further comprises four radial outlet ports (15, 15') distributed equally around a lateral surface of the cylindrical body (40, 40'), each of said outlet ports (15, 15') being provided with a respective plug (17, 17').

This invention proposes a method of modernizing a flexible conduit line (50), wherein the modernization method comprises the following steps performed in at least one end fittings joint (11, 12, 13), preferably in each end fittings joint (11, 12, 13), namely removing the check valve (16) or the plug (17) from at least one outlet port (15) of the end fitting (111, 121, 131), removing the check valve (16') or the plug (17') from at least one outlet port (15') of the adjacent end fitting (111', 121', 131'), installing a tubular line (90) in an external position to provide fluid communication between said at least one outlet port (15) of the end fitting (111, 121, 131) and said at least one outlet port (15') of the adjacent end fitting (111', 121', 131').

Figure 4:
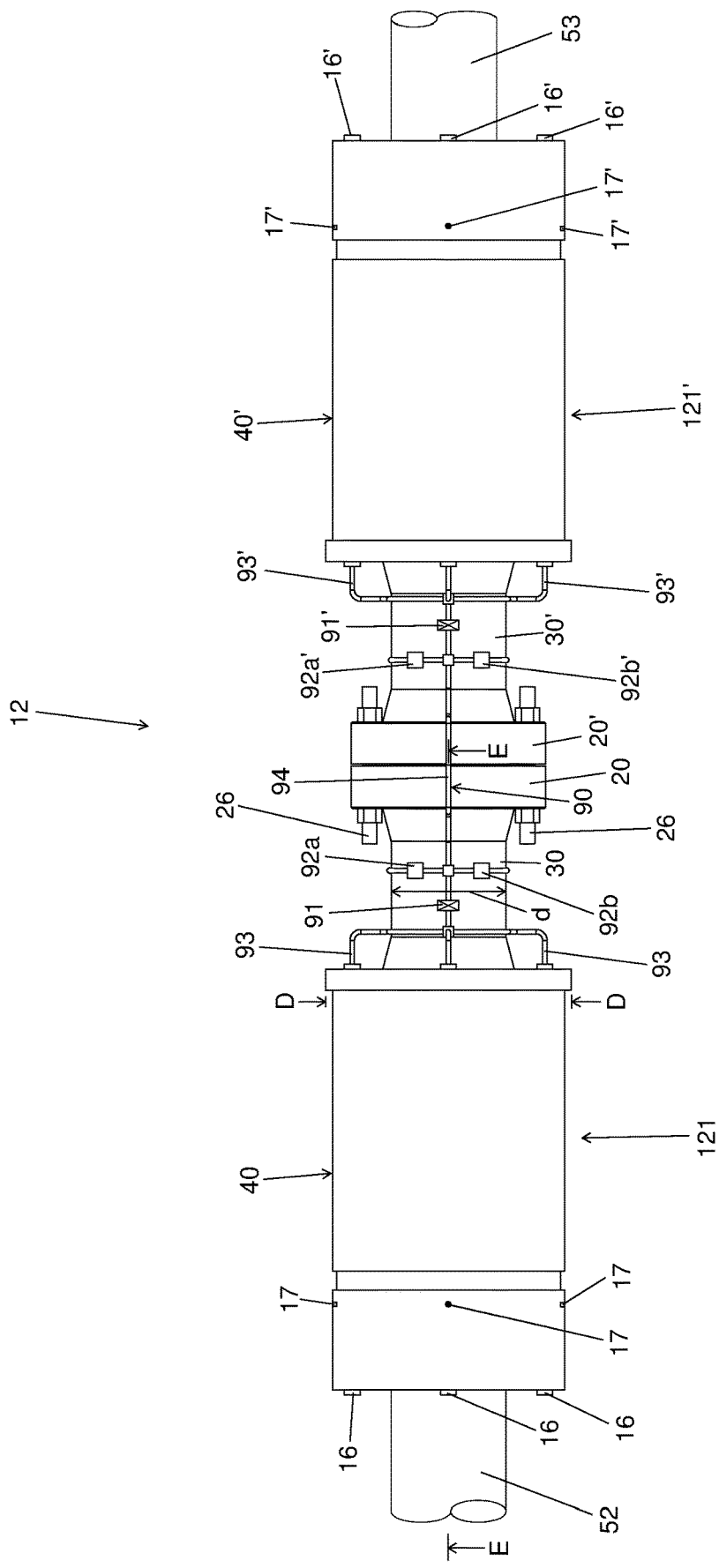
FIG. 4 shows a front view of an end fittings joint according to a first embodiment of the invention.
Figure 5:
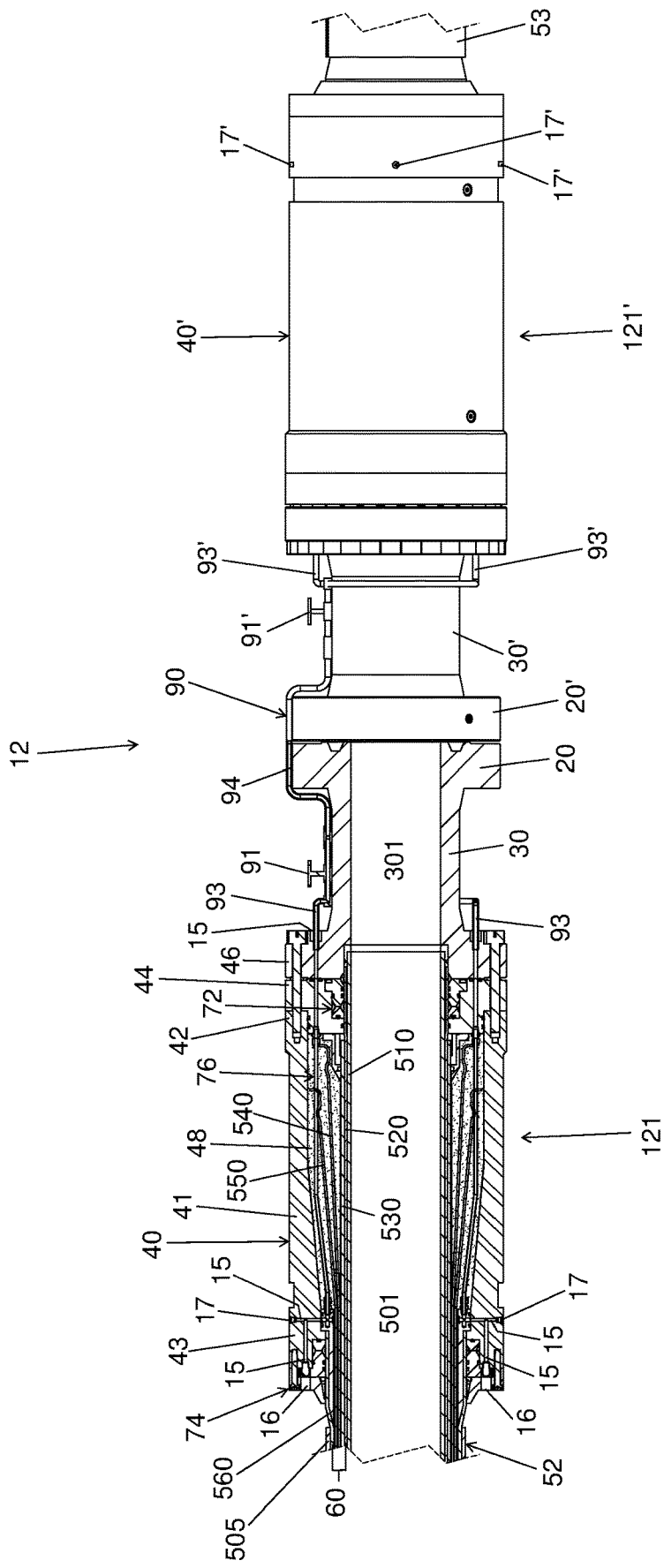
FIG. 5 shows a bottom view of the end fittings joint according to the first embodiment of the invention, in a partial cross-section according to the cutting plane E-E indicated in FIG. 4.

FIGS. 4 and 5 show a detail view of the second end fittings joint (12) from the "A" region shown in FIG. 1, wherein the end fittings joint (12) is shown in a final configuration after the application of the modernization method according to a first embodiment of the invention. The following description is made on the basis of said end fittings joint (12), however, it is applicable to the other end fittings joints (11, 13) present along the flexible conduit line (50). The modernization method can be carried out in a flexible conduit line (50) already installed in an offshore environment, such as in the flexible conduit line (50) shown in FIG. 1. To this end, for example, first, the flexible conduit line (50) is removed from its operating position in the water-submerged region (2). Then, the modernization method is applied and then the flexible conduit line (50) is reinstalled in its operating position in the water-submerged region (2). Alternatively, the modernization method may be performed in a new flexible conduit line (50), before said flexible conduit line (50) is installed in the water-submerged operating position (2).

According to the modernization method proposed by the invention, the externally installed tubular line (90) establishes fluid communication between the annular region (60) of the flexible conduit segment (52) and the annular region (60) of the adjacent flexible conduit segment (53). In a flexible conduit line (50) in which all end fittings joints (11, 12, 13) are modernized, according to the method proposed herein, there will be a fluid interconnection between the annular regions (60) of all flexible conduit segments (51, 52, 53, 54). Thus, when the modernized flexible line (50) is in operation, the gas permeating into the annular region (60) of each flexible conduit segment (51, 52, 53, 54) may run through the flexible conduit line (50) to be discharged through an outlet port present in a top end fitting (141) installed in a region above the water surface (3). The gas discharged through the top end fitting (141) may then be led to a burning system or to a storage location present in the floating facility (5). For example, the outlet port of the top end fitting (141) may be subjected to atmospheric pressure, so whenever the gas pressure contained in the annular region (60) of the flexible conduit segments (51, 52, 53, 54) exceeds the atmospheric pressure, there will be a tendency for the gas to traverse the flexible conduit line (50) to be discharged by the top end fitting (141).

Advantageously, the modernization method proposed by the invention makes it possible to update a flexible conduit line (50) used and already installed in an operating position or a new flexible conduit line (50) about to be installed in an operating position, from a configuration in which the gases permeated to an annular region (60) of each flexible conduit segment (51, 52, 53, 54) are discharged to the marine environment (2) through check valves (16, 16') present in the end fittings (121, 121'), to a configuration in which the gases permeated to an annular region (60) of a flexible conduit segment (51, 52, 53, 54) are discharged through a fluid interconnection established by the tubular line (90) between the annular regions (60) of two adjacent flexible conduit segments, without the need for installing a new suitable end fitting at each end of each flexible conduit segment (51, 52, 53, 54), as the end fitting described in U.S. Pat. No.

6,039,083. In the context of the modernization of an used flexible conduit line (50), advantageously, the modernization method proposed by the invention enables a time saving in which the flexible conduit line (50) will be out of operation since the process of installing a new end fitting in a flexible conduit segment is notoriously cumbersome and time-consuming, and there is a financial savings related to the cost of this new end fitting.

The invention also proposes an end fittings joint (12) comprising an end fitting (121) suitable to be installed at one end of a flexible conduit segment (52), an adjacent end fitting (121') suitable to be installed at one end of an adjacent flexible conduit segment (53), the end fitting (121) being connectable to the adjacent end fitting (121'). Each flexible conduit segment (52, 53), as previously described, comprises a first fluid retention layer (520) and at least one additional fluid retention layer (560), the adjacent fluid retention layers (520, 560) defining between them an annular region (60), each flexible conduit segment (52, 53) further comprising a pressure armor (530) and at least one tensile armor (540, 550). Each end fitting (121, 121') comprises at least one outlet port (15, 15') configured to be in fluid communication with the annular region (60) of the flexible conduit segment (52, 53) in which the end fitting (121, 121') will be installed.

According to the invention, the end fittings joints (12) comprises, as can be seen in a first embodiment shown in FIGS. 4 and 5, a tubular line (90) positioned externally to the end fittings (121, 121'), providing fluid communication between at least one outlet port (15) of the end fitting (121) and at least one outlet port (15') of the adjacent end fitting (121').

In general, the following description contemplates features of the invention pertinent to the modernization method and the end fittings joint. Any particularities of the modernization method or the end fittings joint are described wherever appropriate.

As shown in FIGS. 4 and 5, each end fitting (121, 121') of the end fittings joint (12) comprises a cylindrical body (40, 40') followed by a neck (30, 30') terminated in a connecting flange (20, 20') with a connecting face. The connection between an end fitting (121) and an adjacent end fitting (121') can be accomplished by a face-to-face connection of the connecting faces of the connecting flanges (20, 20') of both end fittings (121, 121') and securing by bolts (26) through both connecting flanges (20, 20').

Preferably, the tubular line (90) includes a first on-off valve (91), and more preferably a second on-off valve (91') installed in series, which may be used to interrupt fluid communication between the annular regions (60) of the flexible conduit segments (52, 53), for example to perform some maintenance operation. Preferably, the on-off valves (91, 91') are operable by a remotely operated underwater vehicle—ROV. Advantageously, the on-off valves (91, 91') also enable a more efficient installation of the flexible conduit line (50) in the marine environment (2), avoiding possible flooding of the annular region (60) of all flexible conduit segments (51, 52, 53, 54). To this end, before starting the submersion of the flexible conduit line (50), the on-off valves (91, 91') are closed so as to interrupt the fluidic interconnection between the annular regions (60) of adjacent flexible conduit segments. After submerging the flexible conduit line (50), it is possible to identify whether the annular region (60) of one of the flexible conduit segments (51, 52, 53, 54) has flooded, for example due to the ingress of sea water as a result of a possible failure present in its outer fluid retention layer (560). If one of the flexible conduit segments (51, 52, 53, 54) has been flooded, advantageously, the flooding will be restricted to this flexible conduit segment, in view of the closed position of the respective on-off valves (91, 91') associated with this flexible conduit segment. If no flooding has been detected, the on-off valves (91, 91') may be opened so as to establish fluid interconnection between the annular regions (60) of all flexible conduit segments (51, 52, 53, 54) present in the flexible conduit line (50).

Preferably, the tubular line (90) includes at least one monitoring, control or safety element (92a, 92b, 92a', 92b') used to monitor parameters of the fluid passing through the tubular line (90), or to perform a fluid control of the tubular line (90) or ensure the operational safety of the tubular line (90). The monitoring, control or safety elements (92a, 92b, 92a', 92b') may include at least one hot stab device and/or at least one pressure gauge and/or at least one check valve and/or at least one rupture disk and/or at least one sensor, such as a thermocouple or a flow meter, among other elements. Preferably, the monitoring, control or safety elements (92a, 92b, 92a', 92b') are accessible and/or operable by a remotely operated underwater vehicle—ROV.

A hot stab device enables a sample withdrawal of fluid contained in the tubular line (90) from the annular region (60) of the flexible conduit segments (52, 53) and/or enables the injection of some cleaning or protection fluid, which acts on the mitigation of the corrosion process, into the tubular line (90) and consequently into the annular region (60) of the flexible conduit segments (52, 53). A pressure gauge makes it possible to check the fluid pressure contained in the tubular line (90). A check valve may be configured to open when a pressure differential is reached, so as to allow fluid exhaust from the tubular line (90) to the outside environment. The check valve functions as a redundant safety element preventing excessive pressurization of the annular regions (60) in case the tubular line (90) is eventually clogged in such a way as to interrupt the fluid interconnection between the annular regions (60) of the different flexible conduit segments (51, 52, 54, 54). In addition, the check valve provides an operative option to return the flexible conduit line (50) to a configuration wherein the gases permeated to the annular region (60) of the flexible conduit segments (51, 52, 53, 54) are directly dischargeable to the marine environment (2). To that end, the on-off valves (91, 91') are closed so as to interrupt the fluid interconnection between the annular regions (60) of adjacent flexible conduit segments. It is noted that this operating option can be performed by a check valve present in the tubular line (90) and/or by a check valve (16, 16') present on some outlet port (15, 15') of the end fittings (121, 121'). A rupturing disc may be configured to brake when a pressure differential is reached, so as to allow fluid to escape from the tubular line (90) to the outside environment. The rupturing disc functions as a redundant safety element preventing excessive pressurizing of the annular regions (60) in case the tubular line (90) is eventually clogged, and, if there is a check valve, if it is also clogged. A sensor may be used to monitor some parameter of the fluid passing through the tubular line (90), such as, for example, temperature by means of a thermocouple and/or volumetric flow rate by means of a flow meter.

Preferably, the modernization method comprises the steps of removing the check valve (16) or the plug (17) from at least two outlet ports (15) of the end fitting (121), removing the check valve (16') or the plug (17') of at least two outlet ports (15') of the adjacent end fitting (121'), installs the tubular line (90) having a respective converging conduit (93), which extends from said outlet ports (15') of the end fitting (121) to an end of a main conduit (94) and having a respective converging conduit (93') extending from said outlet ports (15') of the adjacent end fitting (121') to an opposite end of the main conduit (94). In the embodiment shown in FIGS. 4 and 5, the four check valves (16) of the longitudinal outlet ports (15) present on the anterior face of the cylindrical body (40) of the end fitting (121) are removed and four converging conduits (93) are installed, which extend from said outlet ports (15) of the end fitting (121) to an end of the main conduit (94), and the four check valves (16') are removed from the longitudinal outlet ports (15') present on the anterior face of the cylindrical body (40') of the adjacent end fitting (121') and four converging conduits (93') are installed extending from said outlet ports (15') of the adjacent end fitting (121') to the opposite end of the main conduit (94).

Preferably, the tubular line (90) of the end fittings joint (12) comprises a converging conduit (93) extending from an outlet port (15) of the end fitting (121) and at least one additional converging conduit (93), which extends from a further outlet port (15) of the end fitting (121), said converging conduits (93) being connected to one end of a main conduit (94), and comprises a converging conduit (93') extending from an outlet port (15') of the adjacent end fitting (121') and at least one further converging conduit (93') extending from another outlet port (15') of the adjacent end fitting (121'), said converging conduits (93') being connected to an opposing end of the main conduit (94). In the embodiment shown in FIGS. 4 and 5, the tubular line (90) comprises four converging conduits (93) extending from four longitudinal outlet ports (15) present in an anterior face of the cylindrical body (40) of the end fitting (121) to one end of the main conduit (94), and comprises four converging conduits (93') extending from four longitudinal outlet ports (15') present in an anterior face of the cylindrical body (40') of the adjacent end fitting (121') to the opposite end of the main conduit (94).

Preferably, as can be seen in FIGS. 4 and 5, the on-off valves (91, 91') are installed in the main conduit (94). Preferably, the monitoring, control or safety elements (92a, 92b, 92a', 92b') are installed in the main conduit (94), preferably in a position contained between the on-off valves (91, 91'). The monitoring, control or safety elements (92a, 92b, 92a', 92b') may be installed in parallel to each other and/or in series with respect to one another and/or in branches from the main conduit (94).

Preferably, as can be seen in FIGS. 4 and 5, the tubular line (90) is installed and/or is contained in an annular space comprised between an inner diameter (d) and an outer diameter (D), wherein the inner diameter (d) corresponds to an outer surface of smallest diameter of the neck (30, 30') of the end fitting (121) or of the adjacent end fitting (121') and the outer diameter (D) corresponds to an outer surface of greatest diameter of the cylindrical body (40', 40') or of the connecting flange (20, 20') of the end fitting (121) or of the adjacent end fitting (121'). Preferably, as can be seen in FIGS. 4 and 5, the annular space is comprised between an anterior face of the cylindrical body (40) of the end fitting (121), which faces the connecting flange (20) of the end fitting (121), and an anterior face of the cylindrical body (40') of the adjacent end fitting (121'), which faces the connecting flange (20') of the adjacent end fitting (121'). According to the first embodiment of the invention, as can be seen in FIGS. 4 and 5, the tubular line (90) is installed contouring the connecting flanges (20, 20') of each end fitting (121, 121').

The tubular line (90) may comprise circular and/or helical sections in association with longitudinal sections. The embodiment of the tubular line (90) shown in FIG. 4 comprises a first circular section around the neck (30) of the end fitting (121) and a second circular section around the neck (30') of the adjacent end fitting (121'). These features enable the tubular line (90) to be equipped with two identical monitoring, control or safety elements (92a, 92b, 92a', 92b'), each arranged in an angular position different from each other. For example, it would be possible for the tubular line (90) to be equipped with a first hot stab device and with a second hot stab device 180 degrees offset around the neck (30, 30') relative to the first hot stab device. This is advantageous when the flexible conduit segments (52, 53) are resting on the seabed (4). In this case, one of the hot stab devices could be facing the seabed (4) and therefore inaccessible to the ROV, but in this condition, surely the other hot stab device would be accessible to the ROV.

Figure 6:
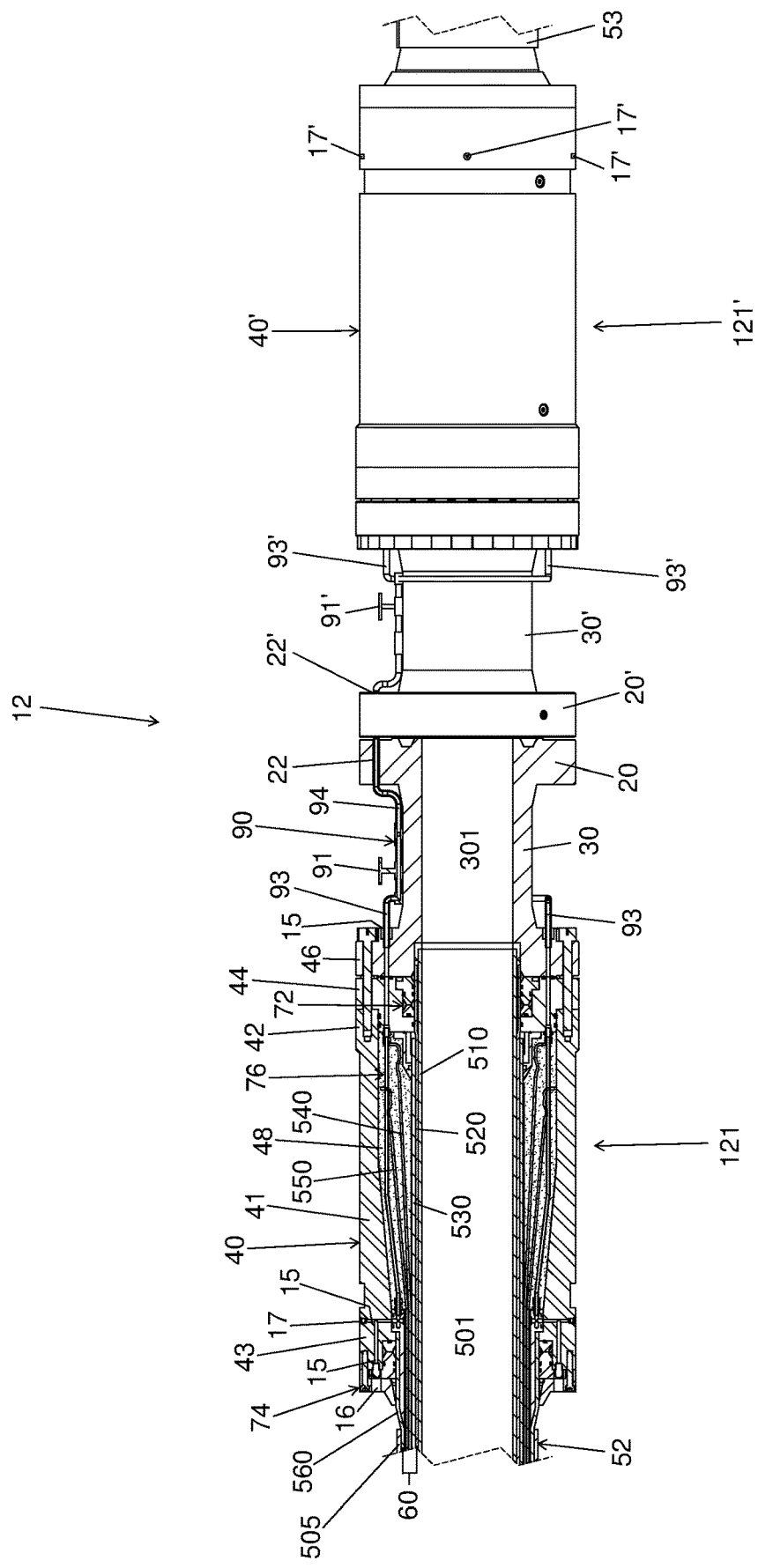
FIG. 6 shows a view equivalent to FIG. 5 of an end fittings joint according to a second embodiment of the invention.

FIG. 6 shows an end fittings joint (12) in a final configuration after the application of the modernization method according to a second embodiment of the invention. FIG. 6 also illustrates a second embodiment of the end fittings joint (12) proposed by the invention. The second embodiment of the invention is identical to the first embodiment, except that, as can be seen in FIG. 6, the tubular line (90) is installed so as to pass through a bore (22, 22') performed in the connecting flanges of (20, 20') of each end fitting (121, 121').

FIG. 7 shows an end fittings joint (12) in a final configuration after the application of the modernization method according to a third embodiment of the invention. FIG. 7 also illustrates a third embodiment of the end fittings joint (12) proposed by the invention. The third embodiment of the invention is identical to the first embodiment, except that the tubular line (90) is installed so as to pass through at least one groove (45, 45') present in an external lateral surface of the cylindrical body (40, 40') of the end fitting (121) and/or of the adjacent end fitting (121').

More particularly, in the scope of the modernization method, the four plugs (17) of the radial outlet ports (15) present on the outer lateral surface of the cylindrical body (40) of the end fitting (121) were removed, four longitudinal grooves (45) were machined on the outer lateral surface of the cylindrical body (40), and four converging conduits (93) are provided extending from said outlet ports (15) of the end fitting (121) to an end of the main conduit (94), each of the converging conduits (93) passing through one of the grooves (45). Further, the four plugs (17') of the radial outlet ports (15') present on the outer lateral surface of the cylindrical body (40') of the adjacent end fitting (121') were removed, four longitudinal grooves (45') were machined on the outer lateral surface of the cylindrical body (40') and four converging conduits (93') were installed, which extend from said outlet ports (15') of the adjacent end fitting (121') to the opposite end of the main conduit (94), each of the converging conduits (93') passing through one of the grooves (45'). In the scope of the end fittings joint (12), the end fittings (121, 121') are manufactured with respective grooves (45, 45').

Alternatively, according to an embodiment not shown, the tubular line (90) may be installed from outlet ports (15, 15') on the rear face of the cylindrical body (40,40') of the end fittings (121, 121'), said rear face facing the respective flexible conduit segment (52, 53) wherein the respective end fitting (121, 121') is installed. Alternatively, according to an embodiment not shown, the on-off valves (91, 91') and/or the monitoring, control or safety elements (92a, 92b, 92a', 92b') may be positioned at the side of the rear face of the cylindrical body (40, 40') of each end fitting (121, 121'), for example, by means of a respective support clamp attached to the vicinity of the respective flexible conduit segment (52, 53), wherein each end fitting (121, 121') is installed.

For example, the tubular line (90) may comprise stainless steel pipes and appropriate connections. The pipes may comprise anti-corrosion coating.

The end fittings (121, 121') further comprise other known technical features. The following description is made as a basis on the end fitting (121), but also applies to the adjacent end fitting (121'). Particularly in the embodiment shown in FIGS. 5 and 6, the cylindrical body (40) of the end fitting (121) is formed of independent parts secured to each other, including an outer seal assembly (74), an outer housing (41) in tubular-shape, an intermediate flange (44) and a closing portion (46). The closing portion (46) is integrated with the neck (30), which is integrated with the connecting flange (20), forming a single member having an inner channel (301).

The outer seal assembly (74) cooperates with a rear end (43) of the outer housing (41) and with the outer fluid retention layer (560) of the flexible conduit segment (52) so as to cause a sealing in relation to the environment external to said flexible conduit segment (52). The intermediate flange (44) is secured to a front end (42) of the outer housing (41) and receives an inner seal assembly (72). The inner seal assembly (72) acts on the inner fluid retention layer (520) of the flexible conduit segment (52) so as to practice a seal relative to the inner channel (501) of said flexible conduit (52). The outer seal assembly (74) and the inner seal assembly (72) may be configured as described in WO2015027304.

The intermediate flange (44) and the outer housing (41) form an annular chamber (48) within which extends a portion of the wires of each tensile armor (540, 550). During the installation process of the end fitting (121) in the flexible conduit segment (52), the annular chamber (48) is filled with a filler material, such as an epoxy resin, in order to anchor the tensile armors (540, 550) to the end fitting (121). The closure portion (46) is secured to the intermediate flange (44) and to the outer housing (41).

The outlet ports (15) of the end fitting (121) are in fluid communication with the annular region (60) of the flexible conduit segment (52) through a respective exhaust path (76) present internally to the end fitting (121).

The invention also proposes an interconnection module (80). An embodiment of the interconnecting module (80) can be seen in FIGS. 9 to 11. The interconnection module (80) comprises a cylindrical body (82) having a longitudinal inner channel (823), a first end terminated in a first connecting flange (821) connectable to a connecting flange (20) of a first end fitting (121) suitable to be installed at one end of a first flexible conduit segment (52), and a second end terminated in a second connecting flange (822) connectable to a connecting flange (20') of a second end fitting (121') suitable to be installed at one end of a second flexible conduit segment (53). Each flexible conduit segment (52, 53), as previously described, comprises a first fluid retention layer (520) and at least one additional fluid retention layer (560), the adjacent fluid retention layers (520, 560) defining between them an annular region (60), each flexible conduit segment (52, 53) further comprising a pressure armor (530) and at least one tensile armor (540, 550). Each end fitting (121, 121') comprises at least one outlet port (15, 15') configured to be in fluid communication with the annular region (60) of the flexible conduit segment (52, 53) in which the end fitting (121, 121') will be installed. The interconnection module (80) further comprises a tubular line (90) in an external position configured to provide fluid communication between said at least one outlet port (15) of the first end fitting (121) and said at least one port (15') of the second end fitting (121').

In the embodiment shown, as can be seen in FIG. 11, each end fitting (121, 121') comprises a cylindrical body (40, 40') followed by a neck (30, 30') terminated in a connecting flange (20, 20') with a connection face. The connection between the interconnection module (80) and the first end fitting (121) may be accomplished by a face-to-face connection of a connecting face of the first connecting flange (821) of the interconnection module (80) with the connection face of the connecting flange (20) of the first end fitting (121) and fixation by screws (27) passing through both connecting flanges (821, 20). The connection between the interconnection module (80) and the second end fitting (121') can be accomplished by a face-to-face connection of a connecting face of the second connecting flange (822) of the interconnection module (80) with the connecting face of the connecting flange (20') of the second end fitting (121') and securing by screws (28) through both connecting flanges (822, 20').

Preferably, the tubular line (90) of the interconnection module (80) includes a first on-off valve (91), and more preferably a second on-off valve (91') installed in series, which may be used to interrupt fluid communication between the annular regions (60) of the flexible conduit segments (52, 53), for example to perform some maintenance operation. Preferably, the on-off valves (91, 91') are operable by a remotely operated underwater vehicle—ROV. The functionality and application of the on-off valves (91, 91') of the interconnection module (80) may be the same as those of the on-off valves (91, 91') present in the end fittings joint (12) described above.

Preferably, the tubular line (90) of the interconnecting module (80) includes at least one monitoring, control or safety element (92a, 92b) used to monitor parameters of the fluid passing through the tubular line (90), or to perform a fluid control of the tubular line (90) or ensure the operational safety of the tubular line (90). The monitoring, control or safety elements (92a, 92b) may include at least one hot stab device and/or at least one pressure gauge and/or at least one check valve and/or at least one rupture disk and/or at least one sensor, such as a thermocouple or a flow meter, among other elements. Preferably, the monitoring, control or safety elements (92a, 92b) are accessible and/or operable by a remotely operated underwater vehicle—ROV. The functionality and application of the monitoring, control or safety elements (92a, 92b) of the interconnection module (80) may be the same as those of the monitoring, control or safety elements (92a, 92b, 92a', 92b') present in the end fittings joint (12) described above.

The tubular line (90) of the interconnection module (80) comprises a main conduit (94) having a first end attached to at least two converging conduits (93), each of said converging conduits (93) being connectable to a respective port (15) of the first end fitting (121). In the embodiment shown in FIGS. 9 to 11, the first end of the main conduit (94) is connected to four converging conduits (93). The main conduit (94) also has a second end attached to at least two converging conduits (93'), each of these converging conduits (93') being connectable to a respective outlet port (15') of the second end fitting (121'). In the embodiment shown in FIGS. 9 to 11, the second end of the main conduit (94) is connected to four converging conduits (93').

Preferably, as can be seen in FIGS. 9 to 11, the on-off valves (91, 91') are installed in the main conduit (94). Preferably, the monitoring, control or safety elements (92a, 92b) are installed in the main conduit (94), preferably in a position contained between the on-off valves (91, 91'). The monitoring, control or safety elements (92a, 92b) may be installed in parallel to each other and/or in series with respect to one another and/or in branches from the main conduit (94).

Preferably, the tubular line (90) is contained in an annular space comprised between an inner diameter (d) and an outer diameter (D), wherein the inner diameter (d) corresponds to an external surface of smallest diameter of the neck (30, 30') of the first end fitting (121) or of the second end fitting (121') and the outer diameter (D) corresponds to an outer surface of greatest diameter of the cylindrical body (40, 40') or of the connecting flange (20, 20') of the first end fitting (121) or of the second end fitting (121'). According to the embodiment shown in FIGS. 9 to 11, the on-off valves (91, 91') and/or the monitoring, control or safety elements (92a, 92b) are contained in an annular space comprised between the connecting flanges (821, 822) of the interconnection module (80). These features are favorable for the complete manufacturing of the interconnecting module (80) and its tubular line (90) in a manufacturing unit, with only the final connections of the tubular line (90) at the outlet ports (15, 15') of the end fittings (121, 121') remaining to be performed at an installation site.

The tubular line (90) may comprise circular and/or helical sections in association with longitudinal sections. The embodiment of the tubular line (90) shown in FIGS. 9 to 11 comprises a circular section around the cylindrical body (82) of the interconnection module (80). These features enable the tubular line (90) to be equipped with two identical monitoring, control or safety elements (92a, 92b), each arranged in an angular position different from each other. For example, it would be possible for the tubular line (90) to be equipped with a first hot stab device and with a second hot stab device 180 degrees offset around the cylindrical body (82) relative to the first hot stab device. This is advantageous when the segments of flexible conduits (52, 53) are resting on the seabed (4). In this case, one of the hot stab devices could be facing the seabed (4) and therefore inaccessible to the ROV, but in this condition, surely the other hot stab device would be accessible to the ROV.

Alternatively, according to an embodiment not shown, the first on-off valve (91) is contained in a first annular space comprised between an anterior face of the cylindrical body (40) of the first end fitting (121) and the connecting flange (20) of the first end fitting (121), said anterior face of the cylindrical body (40) facing the connecting flange (20) of the first end fitting (121), and the second on-off valve (91') is contained in a second annular space comprised between an anterior face of the cylindrical body (40') of the second end fitting (121') and the connecting flange (20') of the second end fitting (121'), said anterior face of the cylindrical body (40') facing the connecting flange (20') of the second end fitting (121'). These features are advantageous because they enable the flow of fluid through the tubular line (90) to be interrupted and enable the interconnection module (80) to be disconnected from the adjacent end fittings (121, 121') for possible maintenance while at the same time ensuring a fluid isolation of the annular region (60) of the flexible conduit segments (52, 53) in which the end fittings (121, 121') are installed.

According to the embodiment shown in FIGS. 9 to 11, the tubular line (90) contours the connecting flanges (20, 20') of each end fitting (121, 121') and the connecting flanges (821, 822) of the interconnection module (80). Alternatively, according to an embodiment not shown, the tubular line (90) passes through a bore present in the connecting flanges (20, 20') of each end fitting (121, 121') and in the connecting flanges (821, 822) of the interconnection module (80).

Alternatively, according to an embodiment not shown, the tubular line (90) passes through at least one groove present on an external lateral surface of the cylindrical body (40, 40') of the first end fitting (121) and/or of the second end fitting (121'). This configuration is advantageous for connecting the tubular line (90) to radial outlet ports (15, 15') present on the external lateral surface of the cylindrical body (40, 40') of each end fitting (121, 121') and/or at longitudinal outlet ports (15, 15') present on the rear face of the cylindrical body (40, 40') of each end fitting (121, 121'), said rear face of the cylindrical body (40, 40') facing the respective flexible conduit segment (52, 53).

Preferably, the tubular line (90) is configured without fluid communication with the inner channel (823) of the cylindrical body (82) of the interconnection module (80).

For example, the tubular line (90) may comprise stainless steel pipes and appropriate connections. The pipes may comprise anti-corrosion coating.

The interconnection module (80) may be used in association with the modernization method described above, either in a flexible conduit line (50) already installed in an offshore environment or in a new flexible conduit line (50), before said flexible conduit line (50) is installed in the water submerged operating position (2). The interconnecting module (80) may also be used in association with the end fittings joint (12) described above.

Preferred or alternate embodiments described herein are not to be construed as limiting the invention to the described structural forms, and constructive variations may be equivalent without, however, departing from the scope of protection of the invention.

The invention claimed is:

1. A method of modernizing a fluid transport flexible conduit line, the flexible conduit line (50) comprising
   a plurality of flexible conduit segments (51, 52, 53, 54), wherein each flexible conduit segment (51, 52, 53, 54) comprises a flexible conduit body formed by multiple layers, radially spaced and of different materials, in order to establish an inner channel (501) suitable for transporting fluids, the flexible conduit body including a first fluid retention layer (520) and at least one additional fluid retention layer (560) for preventing radial flow of fluid through the flexible conduit body, the adjacent fluid retention layers (520, 560) defining between them an annular region (60), the flexible conduit body including a pressure armor (530), and at least one tensile armor (540, 550),
   at least one end fittings joint (11, 12, 13) comprising an end fitting (111, 121, 131) installed at one end of a flexible conduit segment (51, 52, 53), said end fitting (111, 121, 131) being connected to an adjacent end fitting (111', 121', 131') installed at one end of an adjacent flexible conduit segment (52, 53, 54), wherein each end fitting (111, 111', 121, 121' 131, 131') comprises at least one outlet port (15, 15') in fluid communication with the annular region (60) of the flexible conduit segment (51, 52, 53, 54) in which the end fitting (111, 111', 121, 121' 131, 131') is installed, the outlet port (15, 15') being equipped with a check valve (16, 16') configured to open when a pressure differential is reached, so as to allow gas exhaust from the annular region (60) to an outside environment relative to the flexible conduit segment (51, 52, 53, 54), or the outlet port (15, 15') being equipped with a plug (17, 17'), wherein the modernization method comprises the following steps carried out in at least one end fittings joint (11, 12, 13):

removing the check valve (16) or the plug (17) from at least one outlet port (15) of the end fitting (111, 121, 131)

removing the check valve (16') or the plug (17') from at least one outlet port (15') of the adjacent end fitting (111', 121', 131'), installing a tubular line (90) in an external position to provide fluid communication between said at least one outlet port (15) of the end fitting (111, 121, 131) and said at least one outlet port (15') of the adjacent end fitting (111', 121', 131').

2. The method according to claim 1, wherein each end fitting (121, 121') comprises a cylindrical body (40, 40') followed by a neck (30, 30') terminated in a connecting flange (20, 20').

3. The method according to claim 1, wherein the tubular line (90) includes a first on-off valve (91).

4. The method according to claim 1, wherein the tubular line (90) includes at least one monitoring, control or safety element (92a, 92b, 92a', 92b').

5. The method according to claim 1, wherein the method comprises the steps of removing the check valve (16) or the plug (17) from at least two outlet ports (15) of the end fitting (121), removing the check valve (16') or the plug (17') of at least two outlet ports (15') of the adjacent end fitting (121'), installs the tubular line (90) having a respective converging conduit (93), which extends from said outlet ports (15') of the end fitting (121) to an end of a main conduit (94) and having a respective converging conduit (93') extending from said outlet ports (15') of the adjacent end fitting (121') to an opposite end of the main conduit (94).

6. The method according to claim 4, wherein the monitoring, control or safety elements (92a, 92b, 92a', 92b') include at least one hot stab device and/or at least one pressure gauge and/or at least one check valve and/or at least one rupturing disc and/or at least one sensor.

7. An end fittings joint, comprising an end fitting (121) suitable to be installed at one end of a flexible conduit segment (52), an adjacent end fitting (121') suitable to be installed at one end of an adjacent flexible conduit segment (53), the end fitting (121) being connectable to the adjacent end fitting (121'), each flexible conduit segment (52, 53) comprising a flexible conduit body formed by multiple layers, radially spaced and of different materials, in order to establish an inner channel (501) suitable for transporting fluids, the flexible conduit body including a first fluid retention layer (520) and at least one additional fluid retention layer (560) for preventing radial flow of fluid through the flexible conduit body, the adjacent fluid retention layers (520, 560) defining between them an annular region (60), the flexible conduit body including a pressure armor (530), and at least one tensile armor (540, 550), each end fitting (121, 121') comprising at least one outlet port (15, 15') configured to be in fluid communication with the annular region (60) of the flexible conduit segment (52, 53) in which the end fitting (121, 121') will be installed, wherein the end fittings joint comprises a tubular line (90) positioned externally to the end fittings (121, 121') providing fluid communication between at least one outlet port (15) of the end fitting (121) and at least one outlet port (15') of the adjacent end fitting (121').

8. The end fittings joint according to claim 7, wherein each end fitting (121, 121') comprises a cylindrical body (40, 40') followed by a neck (30, 30') terminated in a connecting flange (20, 20').

9. The end fittings joint according to claim 7, wherein the tubular line (90) includes a first on-off valve (91).

10. The end fittings joint according to claim 7, wherein the tubular line (90) includes at least one monitoring, control or safety element (92a, 92b, 92a', 92b').

11. The end fittings joint, according to claim 7, wherein the tubular line (90) comprises a converging conduit (93) extending from an outlet port (15) of the end fitting (121) and at least one additional converging conduit (93) extending from a further outlet port (15) of the end fitting (121), said converging conduits (93) being connected to one end of a main conduit (94), and comprises a converging conduit (93') extending from an outlet port (15') of the adjacent end fitting (121') and at least one further converging conduit (93') extending from another outlet port (15') of the adjacent end fitting (121'), said converging conduits (93') being connected to an opposing end of the main conduit (94).

12. The end fittings joint according to claim 10, wherein the monitoring, control or safety elements (92a, 92b, 92a', 92b') include at least one hot stab device and/or at least one pressure gauge and/or at least one check valve and/or at least one rupturing disc and/or at least one sensor.

13. The end fittings joint according to claim 8, wherein the tubular line (90) is contained in an annular space comprised between an inner diameter (d) and an outer diameter (D), wherein the inner diameter (d) corresponds to an outer surface of smallest diameter of the neck (30, 30') of the end fitting (121) or of the adjacent end fitting (121') and the outer diameter (D) corresponds to an outer surface of greatest diameter of the cylindrical body (40, 40') or of the connecting flange (20, 20') of the end fitting (121) or of the adjacent end fitting (121').

14. An interconnection module comprising a cylindrical body (82) having a longitudinal inner channel (823), a first end terminated in a first connecting flange (821) connectable to a connecting flange (20) of a first end fitting (121) suitable to be installed at one end of a first flexible conduit segment (52), a second end terminated in a second connecting flange (822) connectable to a connecting flange (20') of a second end fitting (121') suitable to be installed at one end of a second flexible conduit segment (53), each flexible conduit segment (52, 53) comprising a flexible conduit body formed by multiple layers, radially spaced and of different materials, in order to establish an inner channel (501) suitable for transporting fluids, the flexible conduit body including a first fluid retention layer (520) and at least one additional fluid retention layer (560) for preventing radial flow of fluid through the flexible conduit body, the adjacent fluid retention layers (520, 560) defining between them an annular region (60), the flexible conduit body including a pressure armor (530), and at least one tensile armor (540, 550), each end fitting (121, 121') comprising at least one outlet port (15, 15') configured to be in fluid communication with the annular region (60) of the flexible conduit segment (52, 53) in which the end fitting (121, 121') will be installed, a tubular line (90) in an external position configured to provide fluid communication between said at least one outlet port (15) of the first end fitting (121) and said at least one outlet port (15') of the second end fitting (121').

15. The interconnection module, according to claim 14, wherein each end fitting (121, 121') comprises a cylindrical body (40, 40') followed by a neck (30, 30') terminated in a connecting flange (20, 20').

16. The interconnection module, according to claim 14, wherein the tubular line (90) includes a first on-off valve (91).

17. The interconnection module, according to claim 14, wherein the tubular line (90) includes at least one monitoring, control or safety element (92a, 92b).

18. The interconnection module, according to claim 14, wherein the tubular line (90) comprises a main conduit (94) having a first end connected to at least two converging conduits (93), each of said converging conduits (93) being connectable to a respective outlet port (15) of the first end fitting (121), the main conduit (94) having a second end attached to at least two converging conduits (93'), each of said converging conduits (93') being connectable to a respective outlet port (15') of the second end fitting (121').

19. The interconnection module, according to claim 17, wherein the monitoring, control or safety elements (92a, 92b) include at least one hot stab device and/or at least one pressure gauge and/or at least one check valve and/or at least one rupturing disc and/or at least one sensor.

20. The interconnection module according to claim 15, wherein the tubular line (90) is contained in an annular space comprised between an inner diameter (d) and an outer diameter (D), wherein the inner diameter (d) corresponds to an outer surface of smallest diameter of the neck (30, 30') of the first end fitting (121) or of the second end fitting (121') and the outer diameter (D) corresponds to an outer surface of greatest diameter of the cylindrical body (40, 40') or of the connecting flange (20, 20') of the first end fitting (121) or of the second end fitting (121').

\* \* \* \* \*